Patented June 8, 1943

2,321,052

UNITED STATES PATENT OFFICE 2,321,052

BRANCHED CHAIN GUANAMINES AND PROCESSES OF PRODUCING SAME

Jack T. Thurston, Cos Cob, Conn., assignor to American Cyanamid Company, New York, N. Y., a corporation of Maine No Drawing. Application April 26, 1940, Serial No. 331,809

9 Claims. (Cl. 260—248)

This invention relates to branched chain guanamines and to processes of producing same.

An object of this invention is to provide guanamines which have a relatively high fatty oil solubility and high hydrocarbon solubility and which yield hydrocarbon- and fatty oil-soluble products on condensation with aldehydes such as formaldehyde.

Another object of this invention is to provide a process for producing mixtures including a guanamine, together with compounds containing the triazine nucleus and containing reactive amino groups, which compounds are suitable for condensation with formaldehyde and other aldehydes. Still another object is to recover substantaintially pure guanamines from the crude mixture.

Guanamines of the following formula

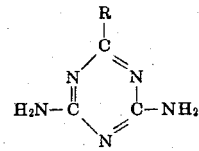

where R is a branched chain aliphatic radical containing at least 7 carbon atoms, are suitable in the attainment of these and other objects of the invention.

Such compounds may be produced, generally in admixture with other aminotriazines, by the interaction of a biguanide with an ester or an acid halide, e. g., an acid chloride of a branched chain aliphatic acid, said acid containing at least 8 carbon atoms. The biguanide may be conveniently generated from a salt thereof as a preliminary step of the process. With the acid halides, the biguanide salts themselves may be used, especially in a solvent medium containing a tertiary amine, e. g., pyridine.

The following examples in which the proportions are in parts by weight are given by way of illustration and not in limitation.

Example 1

| | Parts |
|---|---|
| Absolute ethyl alcohol | 315 |
| Sodium metal | 9.3 |
| Biguanide sulfate | 40 |
| Ethyl ethyl-n-butyl-acetate | |

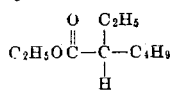

| | 30 |

A solution of sodium ethoxide in alcohol is prepared by adding the metallic sodium to the alcohol and to this solution the biguanide sulfate is added. This mixture is refluxed for about 30 minues. The ethyl ethyl-n-butyl-acetate is then added to this mixture and the refluxing continued for about 20 hours. The resulting product is filtered to remove the solid sodium sulfate which is formed during the process, together with other insoluble solids which may be present. The filtrate which contains the 2(alpha-ethyl-n-amyl)-4,6-diamino-1,3,5-triazine or otherwise termed, the ethyl-n-butyl-acetoguanamine, together with other aminotriazines, is evaporated almost to dryness leaving an oily product from which a solid material separates after standing several weeks. This solid material is separated and is recrystallized from about 180 parts of hot naphtha. The recrystallization is repeated twice and the product thus obtained melts at about 98–101° C. If this product be recrystallized from about 33–36 parts of ethyl acetate, the product melts at about 90–91° C. On the other hand, if the recrystallized product be thoroughly dried under vacuum, the powdery material which results melts between about 108° and 109.5° C. From this data, it is quite apparent that the recrystallized product which is not subjected to vacuum drying is solvated, i. e., carries with it some solvent material. The recrystallized product analyzes as 2(alpha-ethyl-n-amyl)-4,6-diamino-1,3,5-triazine. It is extremely hydrocarbon-soluble and fatty oil-soluble and condensation products of this product with formaldehyde are also hydrocarbon- and fatty oil-soluble. The oily material from which the solid guanamine was separated contains various other aminotriazines. Accordingly, the crude mixture containing the guanamine and the other aminotriazines is also suitable for condensation with formaldehyde without purification and such products are also generally hydrocarbon- and oil-soluble.

Example 2

| | Parts |
|---|---|
| Absolute ethyl alcohol | 350 |
| Sodium metal | 14 |
| Biguanide sulfate | 60 |
| Methyl ethyl-isoamyl-acetate | 57 |

The sodium metal is dissolved in the ethyl alcohol, thereby forming a solution of sodium ethoxide in alcohol and to this solution the biguanide sulfate is added. This mixture is stirred and refluxed for about 45 minutes in order to liberate free biguanide. The methyl ethyl-isoamyl-acetate is added to this mixture and the refluxing is continued for about 25–30 hours. The solid sodium sulfate which is formed is removed by filtration and the alcohol solution evaporated to dryness. The syrup residue is dissolved in 225 parts of hot naphtha and about 25 parts of animal charcoal are added for decolorizing purposes. The solution is filtered hot and from the filtrate a crystalline product is obtained. This product is recrystallized one or more times from hot naphtha and melts between about 97° and 101° C. This product which shows good hydrocarbon solubility is suitable for the preparation of resinous materials by condensation with aldehydes and such condensation products are quite soluble in hydrocarbons and fatty oils. The product contains a relatively large proportion of 2(alpha-ethyl-isohexyl)-4,6-diamino-1,3,5-triazine or the ethyl-isoamyl-acetoguanamine,

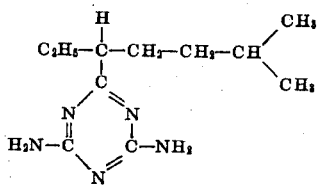

*Example 3*

|  | Parts |
|---|---|
| Absolute ethyl alcohol | 375 |
| Metallic sodium | 14 |
| Biguanide sulfate | 60 |
| Methyl di-n-butyl-acetate | 61 |

The sodium is dissolved in the ethyl alcohol forming a solution of sodium ethoxide in alcohol. The biguanide sulfate is added to the solution and the mixture is refluxed for 30–45 minutes, thereby liberating free biguanide. To this mixture the methyl dibutyl-acetate is added and the mixture is refluxed for 25–30 hours. The sodium sulfate and any other insoluble material is separated from the resulting product by filtration and the filtrate is evaporated to dryness. The product thus produced is dissolved in about 200 parts of chloroform. 2-(alpha-n-butyl-n-amyl)-4,6-diamino-1,3,5-triazine, or the di-n-butyl-acetoguanamine,

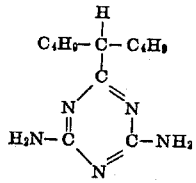

is separated from the various impurities by adding about 50 parts of alcohol, together with about 10–15 parts of concentrated sulfuric acid, thereby precipitating the triazine as a salt of sulfuric acid. The salt is separated by filtration and after removing the residual solvent from the salt, it is suspended in about 125 parts of 95% ethyl alcohol and this mixture is made strongly alkaline by adding about 100 parts of an aqueous solution containing about 30% sodium hydroxide. At first, oily material separates, but upon cooling and stirring, it soon changes to a solid product. This material, which contains a relatively large proportion of the guanamine and usually a small proportion of the corresponding guanide, may be separated and dried in any convenient manner and is suitable for the preparation of resinous materials by condensation with an aldehyde without further purification. Such condensation products are extremely fatty oil- and hydrocarbon-soluble.

Obviously free biguanide may be used in place of the biguanide sulfate used in the above examples or the free biguanide may be produced in any other manner. Other salts of biguanide may be used in place of the sulfate, e. g., the nitrate, hydrochloride, carbonate, etc. It is also possible to use other solvent media than the ethyl alcohol used in the above examples. Among these are other lower alcohols such as methanol, propanol, butanol, etc., benzene, toluene, acetone, the monomethyl ether of ethylene glycol, pyridine and the like.

I have found that the lower alkyl esters of the various branched chain acids are particularly suitable for reaction with biguanide. A few examples of the acids which may be used in the production of guanamines according to my invention are:

| | |
|---|---|
| Ethyl-n-butyl-acetic acid | $CH_3.(CH_2)_3CH(COOH)C_2H_5$ |
| Di-n-propyl-acetic acid | $(CH_3CH_2CH_2)_2CHCOOH$ |
| Methyl-isoamyl-acetic acid | $(CH_3)_2CHCH_2CH_2CH(CH_3)COOH$ |
| Methyl-n-hexyl-acetic acid | $CH_3(CH_2)_5CH(CH_3)COOH$ |
| β,β-Di-n-propyl-propionic acid | $(CH_3.CH_2CH_2)_2CHCH_2COOH$ |
| Diisobutyl-acetic acid | $(CH_3)_2CHCH_2CH(COOH)CH_2CH(CH_3)_2$ |
| n-Amyl-n-heptyl-acetic acid | $CH_3(CH_2)_4CH(COOH)(CH_2)_6CH_3$ |
| Di-n-heptyl-acetic acid | $[CH_3.(CH_2)_6]_2CHCOOH$ |
| Di-n-octyl-acetic acid | $[CH_3(CH_2)_7]_2CHCOOH$ |

Obviously various mixtures of these or the acids used in the above examples or other acids of the same type may be used for the production of mixtures of guanamines which are particularly suitable for various purposes when condensed with formaldehyde or other aldehyde. The esters of the acids and the lower aliphatic alcohols, as well as the aralkyl alcohols, e. g., benzyl alcohol, the cycloaliphatic alcohols, e. g., cyclohexanol and the phenols, e. g., $C_6H_5OH$, cresol, etc., are of particular use for condensation with a biguanide to form my new series of guanamines.

While I have specifically described the production of my new guanamines at normal atmospheric pressure obviously elevated pressure may be used if desirable and if volatile material be employed as solvent or suspension medium, it is necessary to conduct the reaction in a pressure vessel at relatively high pressures.

Obviously many modifications and variations in the processes and compositions described above may be made without departing from the spirit and scope of the invention as defined in the appended claims.

I claim:

1. A guanamine having the following general formula:

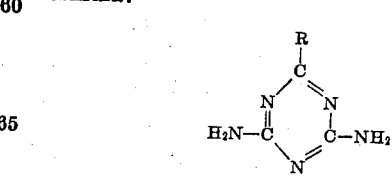

where R is a branched chain aliphatic radical containing at least 7 carbon atoms.

2. Products obtained by the condensation of biguanide and a substance selected from the group consisting of the esters and acid halides of aliphatic branched chain acids containing at least 8 carbon atoms.

3. 2-(alpha-ethyl-n-amyl)-4,6-diamino-1,3,5-triazine having the following general formula:

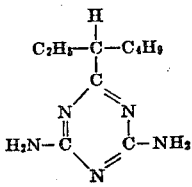

4. 2-(alpha-ethyl-isohexyl)-4,6-diamino-1,3,5-triazine having the following general formula:

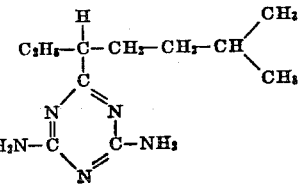

5. 2-(alpha-n-butyl-n-amyl)-4,6-diamino-1,3,5-triazine having the following general formula:

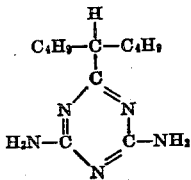

6. A process for the production of 2-(alpha-ethyl-n-amyl)-4,6-diamino-1,3,5-triazine, which comprises condensing in an organic solvent medium biguanide with ethyl ethyl-n-butyl-acetate.

7. A process for the production of 2-(alpha-ethyl-isohexyl)-4,6-diamino-1,3,5-triazine, which comprises condensing in an organic solvent medium biguanide with methyl ethyl-isoamyl-acetate.

8. A process for the production of 2-(alpha-n-butyl-n-amyl)-4,6-diamino-1,3,5-triazine, which comprises condensing in an organic solvent medium biguanide with methyl di-n-butyl-acetate.

9. A process for the production of aminotriazines including a guanamine of the following formula

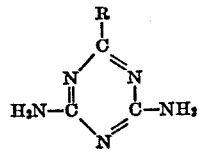

where R is a branched chain aliphatic radical containing at least 7 carbon atoms, which comprises condensing biguanide with a substance selected from the group consisting of the esters and acid halides of aliphatic branched chain acids containing at least 8 carbon atoms.

JACK T. THURSTON.